Figure 1:
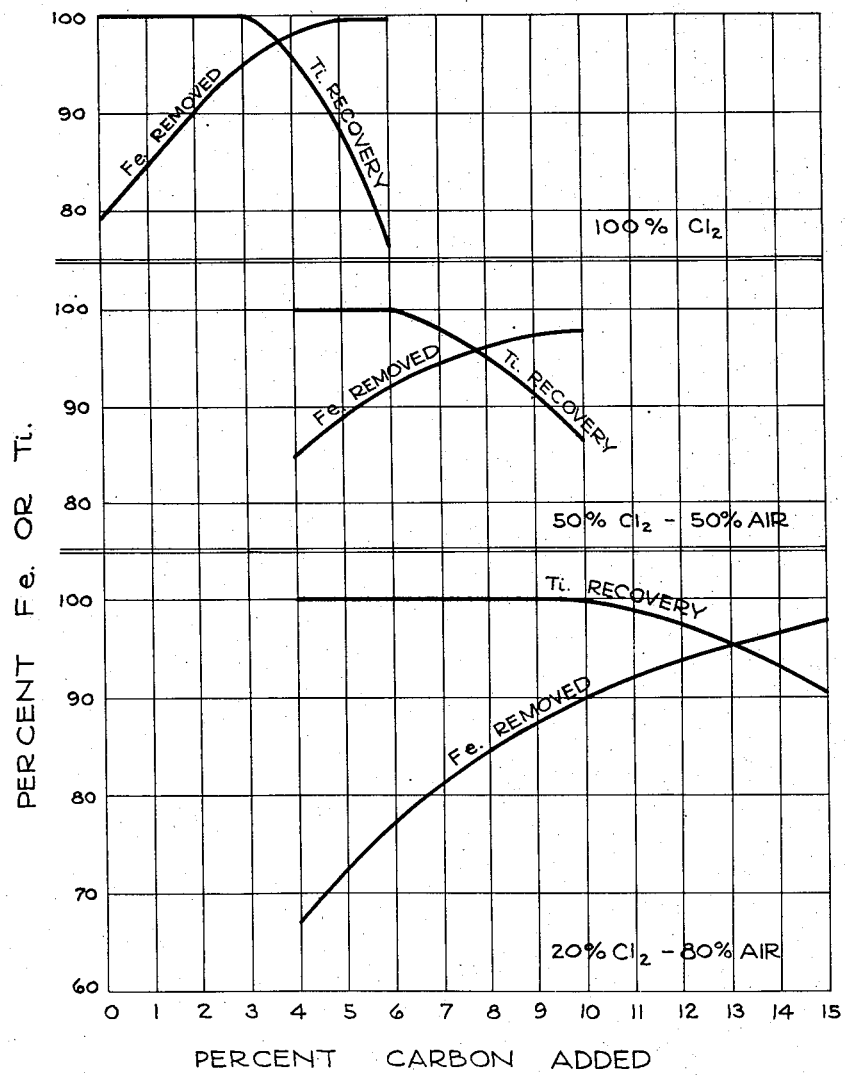

CHLORINATION OF ILMENITE AT 980° C.
Fe. REMOVED & Ti. RECOVERY WITH VARYING CARBON CONCENTRATION

PERCENT CARBON AT WHICH Fe. REMOVED = APPROX. 97.5% AT 980° C.

Patented Dec. 26, 1939

2,184,884

UNITED STATES PATENT OFFICE 2,184,884

TREATMENT OF TITANIUM ORES

Irving E. Muskat and Robert H. Taylor, Akron, Ohio, assignors to Pittsburgh Plate Glass Company, Allegheny County, Pa., a corporation of Pennsylvania Application April 30, 1938, Serial No. 205,322
Renewed September 26, 1939

21 Claims. (Cl. 75—112)

This invention relates to the production of titanium compounds, in particular, titanium tetrachloride and titanium dioxide from iron-titanium ores, such as ilmenite, by chlorination of such ores.

In order to secure titanium dioxide suitable for pigmentary purposes from ferro-titanium ores, it is essential that a careful separation of titanium from iron be secured. Previously, when the recovery of titanium by chlorination has been attempted, considerable difficulty has been encountered in obtaining an iron-free product without substantial loss of titanium since ferric chloride and titanium tetrachloride are both readily volatile at relatively low temperatures. Prior to this invention, the production of a substantially iron-free titanium compound by chlorination of ferro-titanium ores has not been regarded as successful from a commercial standpoint.

We have found that the amount of iron and titanium which may be removed as volatile chlorides from an iron-titanium ore such as ilmenite may be effectively controlled by regulation of the amount of a reducing agent such as carbon which is in intimate contact with the ore during chlorination. Within the range of temperature which we have found it desirable to operate, we have observed that some iron may be removed as volatile chlorides by chlorination of iron-titanium ores without substantial volatilization of titanium compounds without the addition of reducing agents. Such a process can not be used to effectively remove iron from the titanium ore since the iron removal is very incomplete and a considerable quantity of titanium is lost during chlorination. However, we have found that if chlorination of the ore is carried out in the presence of added carbon more or less intimately intermixed with the ore, further amounts of iron are volatilized and at a certain optimum range of carbon concentration, the major portion of the iron may be removed without substantial loss of titanium from the ore. When ore-carbon mixtures containing carbon in excess of this optimum concentration range are chlorinated, some quantity of titanium is volatilized as titanium tetrachloride and, when ore mixtures containing large excesses of carbon are chlorinated, the major portion of the iron and titanium in the ore is thereby removed as volatile chlorides. By chlorination of ore-carbon mixtures in which the carbon concentration approximates the optimum concentration range, previously referred to, we are able to secure a very effective removal of iron from these ores without removing any substantial proportion of the titanium leaving a product which is largely titanium dioxide and contains substantially all of the original content of the titanium.

The range of carbon concentrations necessary to secure such a removal of iron is dependent to some extent, upon the relative amounts of iron and titanium in the ore and upon the temperature of operation. Within the temperature range of 700–1150° C. changes in temperature do not appear to require substantial changes in carbon concentration but at temperatures below this range a slight increase in carbon concentration may be necessary. In addition, the carbon concentration required may be greatly changed by the presence or absence of oxidizing agents such as air, oxygen, ozone, etc., which may be used in conjunction with the chlorinating gas.

In a copending application, Serial No. 206,219 filed April 30, 1938, we have described and claimed the chlorination of iron-titanium ores in the substantial absence of oxidizing gases. The present invention is directed to the chlorination of such ores in the presence of such agents.

Figure 2:
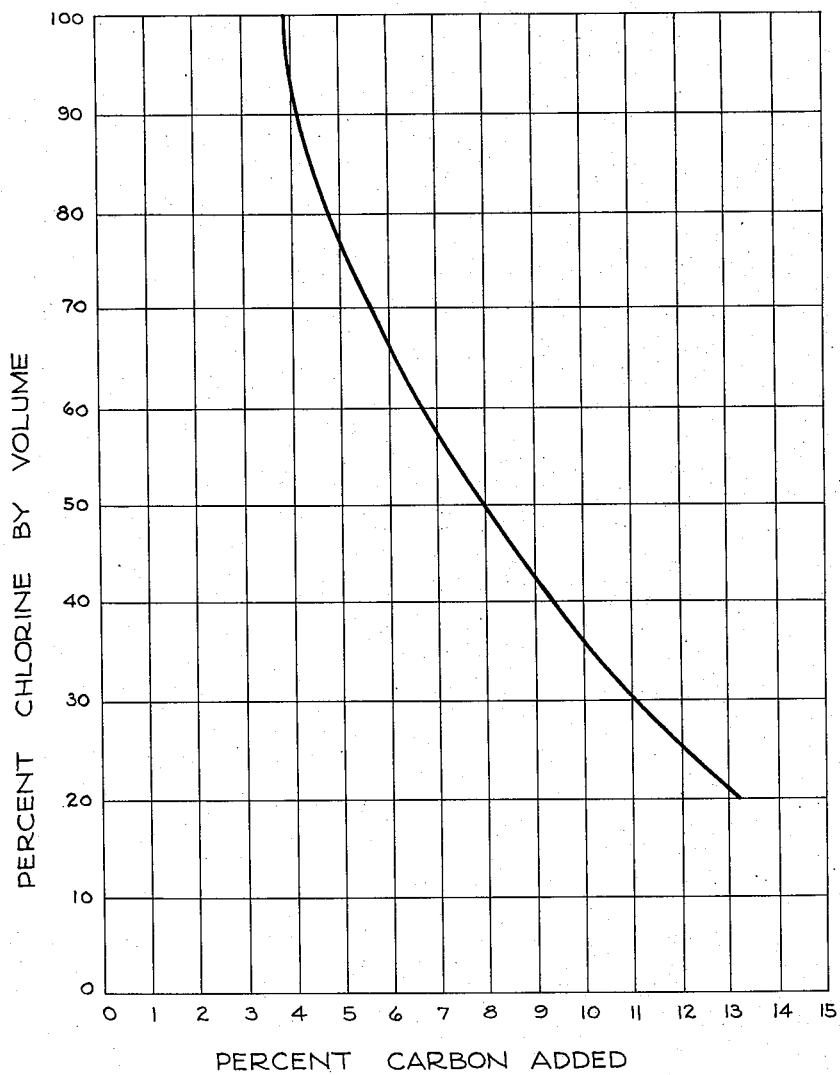

The invention will be more fully understood by reference to the following description illustrated by the accompanying drawings in which Figure 1 is a series of graphs illustrating the effect of varying amounts of carbon upon the amount of iron and titanium which is volatilized by treatment of a mixture of carbon and ilmenite ore with chlorine or with chlorine-air mixtures at 980° C., and Figure 2 is a graph illustrating the effect of varying air concentrations upon the carbon concentration required to secure the removal of a given percentage of iron by chlorination of ore-carbon mixtures at 980° C.

It has been found that most efficient results may be obtained by chlorination at a temperature above 500° C. In general, the use of extremely high temperatures causes melting or softening or ores such as ilmenite to the extent that caking or clinkering occurs and proper distribution of the chlorine becomes extremely difficult if not impossible. While chlorination of ilmenite may be secured at temperatures below 500° C., the reaction is very slow and the heat developed during the reaction does not appear to be sufficient to maintain the operating temperature. For most efficient chlorination, we prefer to maintain the temperature of treatment between 700–1150° C. These temperatures appear to permit maximum iron removal with minimum loss of titanium for a minimum period of chlorination. The graphs in Figure 1 illustrate the variation in the percent of iron and titanium removed as volatile chlorides and the percent of titanium remaining in the residue, with varying amounts of carbon, by chlorinating with chlorine and with air-chlorine mixtures in the presence of varying amounts of carbon. The ore treated contained 25.8 percent iron and 35.2 percent titanium.

Samples of varying carbon content were prepared by adding finely divided carbon to ground up ore and intimately intermixing to form a product of substantially uniform composition. This composition was mixed with 12 percent by weight of molasses calculated upon the weight of the ore and the mixture briquetted to form briquettes of ⅛ inch in diameter which were baked at 400° C. to remove volatile hydrocarbons. The baked briquettes were then chlorinated at a uniform rate of 140 liters of air-chlorine mixtures per minute per kilogram of sample for 5 minutes at 980° C., using air-chlorine mixtures of varying air concentration. The amount of iron and titanium lost was determined by analysis. The carbon concentration is expressed in terms of the number of grams of carbon which was mixed with 100 grams of ore, exclusive of the carbon which may be present due to the addition of the molasses. Thus, it will be seen that for the particular ore in question, with no added carbon, chlorination for 5 minutes in the absence of air at 980° C. resulted in a removal of 79 percent of the total iron initially present in the ore. In contrast to these results, chlorination of an ore-carbon mixture containing 4 percent carbon under the same conditions resulted in removal of 97.5 percent of the iron with a loss of only 3.4 percent of the titanium while treatment in the presence of 6 percent carbon resulted in a removal of 99 percent of the iron and 22 percent of the titanium. The high removal of iron in such a case as the latter example may be particularly advantageous where it is desired to secure a product, which is particularly free of iron, in a single operation.

It will be further noted that when a chlorinating agent consisting of 50 percent by volume of air and 50 percent by volume of chlorine is used, the amount of iron and titanium removed is changed considerably. Thus, with 4 percent carbon, 85 percent of the iron is removed without substantial loss of titanium while at a carbon concentration of 8 percent, approximately 95 percent of the iron and only 5 percent of the titanium are volatilized as chlorides and thereby removed from the residue. When a mixture consisting of 20 percent chlorine and 80 percent air is used, 8 percent carbon results in a removal of 84 percent iron and substantially no titanium while 13 percent carbon results in a removal of 95 percent of the iron and only 5 percent of the titanium. In addition, it will be noted that the presence of air during chlorination appears to result in a flattening out of the curves showing titanium loss and iron removal. Thus, when air is introduced during chlorination. the range of carbon concentrations, which may be used to effectively remove iron without material loss of titanium, may be somewhat wider than the range which is permissible when no air is introduced into the reactor.

Referring to Figure 2, it will be seen that the carbon concentration required to secure a given percentage of iron removal from an ore varies considerably with the amount of air or oxygen used in conjunction with the chlorine with which the ore is treated. Thus, it will be seen that in order to secure a removal of 97.5 percent of the iron in the ore without loss of more than 2.5 percent of the titanium therein, approximately 3.8 percent carbon is required using chlorine alone as the chlorinating agent. In order to secure a similar iron loss without loss of more than 2–2.5 percent of the titanium when chlorinating with a mixture containing 80 volumes of chlorine and 20 volumes of air, the carbon concentration of the ore-carbon mixture should be 5 percent based upon the weight of the ore. When a mixture containing 20 percent by volume of chlorine and 80 percent by volume of air is used, the carbon concentration required to secure this result is 13 percent based upon the weight of the ore.

It will be appreciated, from an examination of Figures 1 and 2, that the carbon and air concentrations may be so regulated that substantially all of the iron is removed, leaving the major portion of the titanium in the residue. The concentration of carbon which may be used for any given air-chlorine mixture depends upon the amount of iron and titanium in the ore and upon the desired purity of the residue. In general, it is preferred to introduce from 1 to 20 percent by weight of carbon based upon the weight of the ore being treated. Preferably, we maintain the carbon concentration within a range of approximately 3–16 percent of the weight of the ore.

The optimum amount of carbon required in order to secure maximum iron removal with minimum loss of titanium varies to some degree with the composition of the ore. Thus, for an ore containing 26 percent Fe and 35 percent Ti, using 50 percent chlorine and 50 percent air, the optimum carbon concentration range is about 6 to 10 percent based upon the weight of the ore. With ores containing additional iron, the optimum carbon concentration may be somewhat higher and, with ores containing less iron, somewhat lower. While this process is adapted for treatment of various ores, it is preferred to treat titanium ores, containing 10–35 percent iron and 20–50 percent or more titanium, such as ilmenite. It will be apparent from the graphs that there will be a highly effective removal of iron for a low titanium loss when the carbon concentration is at an optimum. Within the preferred range of temperature, with higher proportions of added carbon, there are similar slightly greater losses of titanium with increase in carbon content; but at the same time there is a somewhat greater effectiveness in removal of iron with a consequent lower iron content in the residual titanium dioxide.

The ore may be chlorinated in a coarse or finely ground state or in the form of briquettes or other suitable form, mixed with the required proportions of carbonaceous material such as charcoal, coke or the like. Preferably, the ore is ground to minus 100 mesh or finer and is intimately intermixed with finely divided carbon such as petroleum coke, charcoal, etc.; the degree of intermixing being that required to obtain a composition which is approximately homogeneous. While complete homogeneity is not regarded as necessary, the intermixing should be sufficiently thorough to prevent the existence of zones in the mixture wherein the carbon concentration is so high that titanium tetrachloride may be driven off with the iron chloride vapors during the chlorination. We have found it desirable to briquette finely ground carbon-ore mixtures prior to chlorination. These briquettes may be bonded with a suitable binder such as molasses, tar, still residue derived from the distillation of mineral oils, asphalt, bitumen, sodium silicate or other convenient adhesive. Where the binder is carbonaceous, a corresponding reduction in the amount of carbon introduced into the mixture may be permissible. Care should be taken in forming the briquettes to insure sufficient porosity to permit permeation by the chlorine.

When chlorinating briquettes in accordance with our invention, it may be desirable to introduce a quantity of carbon in the form of coke, coal, etc., with the briquettes. Carbon so introduced does not appear to effect the amount of titanium or iron volatilized during the chlorination to the same degree as carbon in the briquettes since it does not present the same amount of surface and is not in such intimate contact with the ore as is the carbon in the briquettes, but it burns in the presence of air, or oxygen, which may be introduced into the chlorination chamber, giving off heat. Excesses of carbon mixed with the briquettes may compensate to some degree for a deficiency of carbon in the briquettes. In general, the temperature of treatment may be controlled and undue cooling of the reaction zone prevented by introduction of carbon in this manner. In addition, carbon so introduced decreases the concentration of excess air or oxygen which has been introduced into the reaction zone and which might otherwise cause a decrease in the amount of iron removed.

The amount of air or oxygen which is used in conjunction with the chlorine may be widely varied providing the carbon content of the ore is adjusted accordingly. Excess concentrations of oxygen may be undesirable since, with extreme chlorine dilutions, the reaction is difficult to regulate and is often incomplete. For this reason, the amount of chlorine used is preferably not substantially less than 20 percent of the total gas introduced into the chamber.

In subjecting the ore to chlorination, we may use mixtures of chlorine and air or oxygen with or without a suitable diluent such as nitrogen, carbon dioxide, etc. If desired, reducing gases such as carbon monoxide may be introduced into the furnace to assist in the reaction.

The gases removed from the reaction chamber may contain quantities of chlorine, carbon monoxide, etc. In the event that it is desired to incorporate reducing gases in the chlorinating gas, the exhaust gas may be treated to remove suspended impurities and after removal of ferric chloride by condensation or other method, may be reintroduced into the reaction chamber with or without additional chlorine. In some cases, where the chlorination is carried out in more than one stage, the exhaust gases from one stage may be used as the chlorinating agent alone or with additional chlorine in earlier stages of the process. This not only serves as a means of conserving chlorine, but also may permit a very efficient preheating of the incoming ore.

If desired, the ore may be given a preliminary chlorination in the absence of reducing agents prior to chlorination in the presence of carbon as heretofore described. Since such a chlorination may remove a portion of the iron initially present, the removal of the major portion of the iron by subsequent chlorination in the presence of the proper amount of carbon may be rendered less difficult.

Ferric chloride is volatilized and is removed with the exhaust gases. It may be precipitated by passing the gases through a suitable cooled condenser whereupon the iron chloride condenses as a solid product of reasonable purity. If desired, the ferric chloride may be precipitated by an electrostatic process or it may be recovered by contacting the gases with water.

The chlorination may be carried out continuously, in batches or in any other convenient manner in suitable furnaces as, for example, induction or resistance type electrical furnaces, kilns, roasting ovens, etc.

It is preferred to operate the process continuously in suitable apparatus such as a shaft furnace. In order to start the process, the furnace may be preheated and when it has been heated to a desirable temperature, for example, above 500° C., an initial charge of ore may be introduced. This charge may consist of a mixture of carbon and briquettes containing carbon and ore. Sufficient oxygen or air and chlorine are introduced to ignite the carbon and to initiate the chlorination reaction. Further charges of briquettes and carbon may be introduced as the reaction proceeds. When the temperature exceeds 500° C., it is found that the chlorination reaction occurs with such rapidity and with sufficient evolution of heat that the temperature may be maintained without further introduction of air for combustion purposes. Where the charge is brought up to temperature partly or entirely by external heating, after such temperature is reached, external heating may be discontinued.

In order to keep the process in continuous operation, it is preferred to introduce the ore, carbon, chlorine and oxygen, if necessary, at such a rate that the temperature is maintained above 500° C., preferably at 700–1150° C. Ordinarily this may be done by regulating the rate of introduction of carbon-ore mixtures or briquettes in accordance with periodic or continuous observation of the temperature in the reactor. Thus, if the temperature begins to decrease, the rate of introduction of the chlorine and/or air and of the ore-carbon mixture may be increased while if the temperature increases, the rate of ore, carbon and chlorine or air introduction may be decreased. It will be understood that the carbon concentration in the ore-carbon mixtures or briquettes should not be in such excess that substantial amounts of titanium are lost. It will also be understood that the temperature may be regulated to some degree by the rate of withdrawal of the chlorinated residue. Thus, a large amount of heat may be dissipated by rapid removal of the residue and the reactor cooled by the cool incoming ore. If desired, a further control of the temperature may be effected by control of the amount of air and chlorine which is introduced into the reactor. Thus, for a given amount of carbon in a charge, a small increase in chlorine concentration may increase the rate of reaction while a small increase in air concentration may tend to retard the reaction.

If difficulty is encountered in maintaining the temperature by the heat of the chlorination reaction, carbon lumps may be added to the reaction zone with or without a charge of briquettes and air or oxygen introduced to burn sufficient carbon to raise the temperature to the desired value. Occasionally, the heat developed during the reaction is so great that the temperature of the reaction zone approximates the sintering temperature of the ore. The reaction may be cooled, if desired, by introduction of a diluent gas such as nitrogen or carbon dioxide. Carbon dioxide appears to be particularly effective as a cooling gas in the reaction. Since substantially uniform results may be secured throughout the range of 700–1150° C., considerable latitude in temperature regulation may be permissible so long as the temperature remains within this range.

The following examples illustrate the invention as applied to ilmenite ore. Other iron-titanium ores may be treated in similar manner.

*Example I.*—100 parts by weight of ilmenite ore containing 26 percent Fe and 35 percent Ti were mixed with 7 parts by weight of carbon and 12 parts by weight of molasses and the mixture was made up into briquettes having an average size of ⅛ inch in diameter by mixing finely divided ore, molasses and carbon together and baking at 400° C. The total carbon content of the briquettes was 7.6 percent.

10 parts by weight of the briquettes were treated with 20 parts by weight of chlorine and 4 parts by weight of air by heating the briquettes to a temperature of 980° C. and passing a stream of chlorine and air through the charge of briquettes. The temperature was maintained at 980° C. The residue contained 93.2 percent $TiO_2$ and 0.74 percent $Fe_2O_3$. The removal of iron was thus 99 percent of the original iron content of the ore while the loss of titanium was only 4 percent.

*Example II.*—100 parts of ilmenite ore containing 26 percent Fe and 35 percent Ti was mixed with 9 parts of carbon and 12 parts molasses and the mixture was made up into briquettes having an average size of ⅛ inch, by mixing finely divided ore, molasses and carbon together and baking. The carbon content of the briquettes was 10 percent.

10 parts by weight of the briquettes were treated with 20 parts by weight of chlorine and 8 parts by weight of air by heating the briquettes to a temperature of 760° C. and passing chlorine and air through the charge of briquettes. The temperature was maintained at 760° C. The residue contained 90 percent $TiO_2$ and 6 percent $Fe_2O_3$. The removal of iron was about 90 percent of the original iron in the ore while the loss of titanium was less than one percent.

*Example III.*—A quantity of briquettes ½ to 1½ inches in diameter were prepared from a mixture of 100 parts by weight of ore, 6 parts by weight of carbon and 12 parts by weight of molasses by baking at 500° C. until the volatile hydrocarbons were substantially removed. The carbon content of the briquettes was about 7 percent of the weight of the briquettes.

A shaft furnace, having an internal diameter of 4 inches was preheated by a coke fire within the shaft at 1000° C. A charge of 6 pounds of briquettes and 6 pounds of coke was introduced and an air blast through the shaft maintained for 5 minutes to insure ignition of the added coke. At this time, 5 pounds of briquettes were added and chlorine introduced into the shaft to initiate the chlorination reaction. The process was carried on continuously for many hours by introducing briquettes at a rate of 10–12 pounds per hour, chlorine at a rate of 29 liters per minute and air at the rate of 17 liters per minute. The treated residue was withdrawn at a rate required to keep the ore in the furnace at a constant level. The temperature remained at 850–1150° C. throughout the reaction. The product withdrawn from the bottom of the furnace contained 2.9 percent iron and 82.6 percent titanium dioxide.

The ore, after chlorination, is found to have a high content of titanium dioxide in which a quantity (usually not more than 2–10 percent) of impurities such as iron, silica, alumina, etc., may be present. It may be used without further treatment for certain purposes. If desired, however, this product may be subjected to a second chlorination to remove titanium therefrom as titanium tetrachloride. This may be done in suitable manner as, for example, by chlorinating in the presence of an excess of carbon as more fully discussed in our copending application Serial No. 205,323 filed April 30, 1938.

In accordance with the process set forth in the above application, the residue may be chlorinated in the presence of a large excess of carbon and both iron and titanium volatilized as chlorides. These vapors may be simultaneously condensed whereby a suspension of solid ferric chloride in liquid titanium tetrachloride is formed. The suspended ferric chloride may be removed by suitable methods such as by settling and/or filtration and the purified titanium tetrachloride recovered. The purified tetrachloride may be decomposed to form titanium dioxide, if desired.

Hydrogen chloride, phosgene or other gaseous chlorinating agents may be used in conjunction with chlorine in accordance with our invention.

Although this invention has been described with reference to specific details of certain embodiments thereof, it is not intended that such details shall be regarded as limitations upon the scope of the invention except insofar as included in the accompanying claims.

We claim:

1. The process of removing iron from titanium bearing ores containing the same which comprises subjecting an intimate mixture of carbon and such ore to the action of a controlled amount of chlorine and an independently controlled amount of oxygen at a temperature above 500° C., the concentration of carbon being sufficient to cause volatilization of a substantial amount of iron chloride but insufficient to permit loss of a material portion of titanium.

2. The process of removing iron from titanium bearing ores containing the same which comprises subjecting an intimate mixture of carbon and ore to the action of a controlled amount of chlorine and an independently controlled amount of oxygen, at a temperature of 700–1150° C., the concentration of carbon sufficient to cause volatilization of a substantial amount of iron chloride but insufficient to permit formation of a material portion of titanium tetrachloride.

3. The process of removing iron from titanium bearing ores containing the same which comprises subjecting an intimate mixture of carbon and ore in the proportion of 100 parts by weight of ore to 1 to 20 parts by weight of carbon to the action of a controlled amount of chlorine and an independently controlled amount of oxygen, the concentration of carbon being sufficient to cause volatilization of a substantial amount of iron chloride but insufficient to permit formation of a material portion of titanium tetrachloride.

4. The process of removing iron from titanium bearing ores containing the same which comprises subjecting an intimate mixture of carbon and ore in the proportion of 100 parts by weight of ore to 3 to 16 parts by weight of carbon to the action of a controlled amount of chlorine and an independently controlled amount of oxygen, the concentration of carbon being sufficient to cause volatilization of a substantial amount of iron chloride but insufficient to permit formation of a material portion of titanium tetrachloride.

5. The process of removing iron from ilmenite ore containing the same which comprises subjecting an intimate mixture of carbon and ore to the action of a controlled amount of chlorine and an independently controlled amount of oxygen at a temperature above 500° C., the concentration of carbon being sufficient to cause volatilization of a substantial amount of iron chloride but insufficient to permit formation of a material portion of titanium tetrachloride.

6. The process of removing iron from ilmenite ore containing the same which comprises subjecting an intimate mixture of carbon and ore to the action of a controlled amount of chlorine and an independently controlled amount of oxygen, at a temperature of 700–1150° C., the concentration of carbon being sufficient to cause volatilization of a substantial amount of iron chloride but insufficient to permit formation of a material portion of titanium tetrachloride.

7. The process of removing iron from titanium bearing ores containing the same which comprises subjecting an intimate mixture of carbon and ore to the action of chlorine and oxygen, the concentration of carbon and oxygen being so regulated that a substantial amount of iron chloride is volatilized without formation of a material portion of titanium tetrachloride, chlorinating the titanium bearing residue under such conditions that iron and titanium are volatilized as chlorides, condensing the iron chloride and titanium tetrachloride together and removing the iron chloride suspended in the titanium tetrachloride.

8. The process of removing iron from ilmenite ore containing the same which comprises subjecting an intimate mixture of carbon and ore in the proportion of 100 parts by weight of ore and 1 to 20 parts by weight of carbon to the action of a controlled amount of chlorine and an independently controlled amount of oxygen, at a temperature of 500° C., the concentration of carbon and oxygen being such that a substantial amount of iron chloride is volatilized without formation of a material portion of titanium tetrachloride.

9. The process of removing iron from ilmenite ore containing the same which comprises subjecting an intimate mixture of carbon and ore in the proportion of 100 parts by weight of ore to 3 to 16 parts by weight of carbon to the action of a controlled amount of chlorine and an independently controlled amount of oxygen, at a temperature of above 500° C., the concentration of carbon and oxygen being sufficient to cause volatilization of a major portion of the iron in the ore but insufficient to permit loss of a material portion of titanium.

10. The process of removing iron from ilmenite ore containing the same which comprises subjecting an intimate mixture of carbon and ore in the proportion of 100 parts by weight of ore to 1 to 20 parts by weight of carbon to the action of a controlled amount of chlorine and an independently controlled amount of oxygen, the concentration of carbon being sufficient to cause volatilization of a substantial amount of iron chloride but insufficient to permit formation of a material portion of titanium tetrachloride.

11. A continuous process of chlorinating iron-titanium ores which comprises chlorinating a mixture of carbon, and ore in a reaction zone, and introducing a controlled amount of chlorine, carbon, an independently controlled amount of oxygen and ore into the reaction zone at such a rate that sufficient heat is evolved from the reaction to maintain the temperature in excess of 500° C. within at least a portion of the reaction zone, the amount of carbon introduced into said zone being within 1 to 20 percent by weight of the weight of the ore being treated and sufficient to cause volatilization of a major portion of the iron in the ore but insufficient to permit loss of a material portion of titanium.

12. A continuous process of chlorinating iron-titanium ores which comprises chlorinating a mixture of carbon, and ore in a reaction zone, and introducing a controlled amount of chlorine, carbon, an independently controlled amount of oxygen and ore into the reaction zone at such a rate that sufficient heat is evolved from the reaction to maintain the temperature in excess of 500° C. within at least a portion of the reaction zone, the amount of carbon introduced into said zone being within 3 to 16 percent by weight of the weight of the ore being treated and sufficient to cause volatilization of a major portion of the iron in the ore but insufficient to permit loss of a material portion of titanium.

13. A continuous process of chlorinating iron-titanium ores which comprises chlorinating a mixture of carbon and ore in a reaction zone, and introducing a controlled amount of chlorine, carbon, an independently controlled amount of oxygen and ore into the reaction zone at such a rate that sufficient heat is evolved from the reaction to maintain the temperature in excess of 500° C. within at least a portion of the reaction zone, the amount of carbon added to the reaction zone being sufficient to cause volatilization of a major portion of the iron in the ore but insufficient to permit loss of a material portion of titanium.

14. A method of removing iron from iron-titanium ores which comprises treating a charge comprising carbon and briquettes containing carbon and ore with chlorine and oxygen at a temperature above 500° C., the carbon content of said charge being sufficient to cause volatilization of a major portion of iron chloride but insufficient to permit substantial loss of titanium.

15. A method of removing iron from iron-titanium ores which comprises treating a charge comprising carbon and briquettes containing carbon and ore with chlorine and oxygen at a temperature of 700–1150° C., the carbon content of said charge being sufficient to cause volatilization of a major portion of iron chloride but insufficient to permit substantial loss of titanium.

16. A method of removing iron from iron-titanium ores which comprises treating a charge comprising carbon and briquettes containing carbon and ore in the proportion of 100 parts by weight of ore to 1 to 20 parts by weight of carbon with chlorine and oxygen at a temperature of above 500° C., the carbon content of said charge being sufficient to cause volatilization of a major portion of iron chloride but insufficient to permit substantial loss of titanium.

17. A method of initiating the reaction between chlorine and an iron titanium ore which comprises introducing a charge of carbon and briquettes containing ore and carbon into a reactor, igniting at least a portion of said carbon, introducing oxygen and chlorine to burn the carbon and to initiate the chlorination and adding further amounts of carbon and briquettes until the heat evolved by the chlorination of the ore is developed with sufficient rapidity to maintain the temperature within the reactor above 500° C.

18. A continuous process of chlorinating iron-titanium ores which comprises chlorinating a mixture of carbon and ore in a reaction zone, and introducing a controlled amount of chlorine, carbon, an independently controlled amount of oxygen and ore into the reaction zone at such a rate that sufficient heat is evolved from the reaction to maintain the temperature of 700-1150° C. within at least a portion of the reaction zone the amount of carbon added to the reaction zone being sufficient to cause volatilization of a major portion of the iron in the ore but insufficient to permit loss of a material portion of titanium.

19. A method of initiating and conducting the reaction between chlorine and an iron-titanium ore which comprises introducing carbon into a reactor, introducing oxygen at a controlled rate to burn at least a portion of the carbon and thereby to heat the interior of the reactor to a temperature not substantially less than 500° C., introducing a mixture of ore and carbon into the reactor, introducing an independently controlled amount of chlorine to initiate the chlorination and continuing the addition of ore chlorine and carbon at a rate such that the heat evolved by the chlorination of the ore is developed with sufficient rapidity to maintain the temperature within the reactor above 500° C.

20. The process of removing iron from titanium bearing materials containing the same which comprises subjecting an intimate mixture of carbon and such materials to the action of a controlled amount of chlorine and an independently controlled amount of oxygen at a temperature above 500° C., the concentration of carbon being sufficient to cause volatilization of substantially all of the iron but insufficient to cause volatilization of a large portion of the titanium, whereby a residue which contains the major portion of the titanium is secured.

21. A method of removing iron from titanium ores containing the same which comprises subjecting an intimate mixture of ore and carbon in the proportion of 100 parts by weight of ore to 1 to 20 parts by weight of carbon to the action of a controlled amount of chlorine and an independently controlled amount of oxygen at a temperature above 500° C., the concentration of carbon being sufficient to cause volatilization of substantially all of the iron but insufficient to volatilize a large portion of the titanium, whereby a residue which contains the major portion of the titanium containing only a minor portion of the iron is secured.

IRVING E. MUSKAT.
ROBERT H. TAYLOR.